Oct. 30, 1951
J. L. RODGERS, JR., ET AL
2,573,361
TORSION TRANSMITTING GLASS SHAFT
AND METHOD OF MANUFACTURE
Filed Feb. 13, 1947
2 SHEETS—SHEET 1
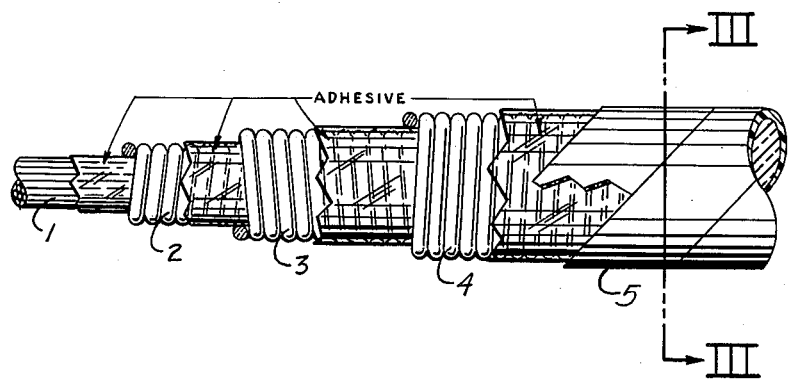
Fig. I
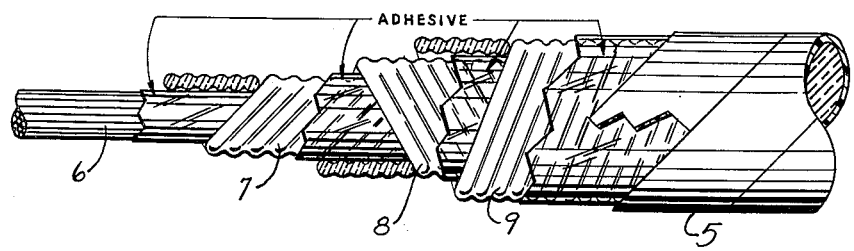
Fig. II
JAMES L. ROGERS, JR.
ARTHUR M. HOWALD
INVENTORS
BY
Marshall and Marshall
ATTORNEYS

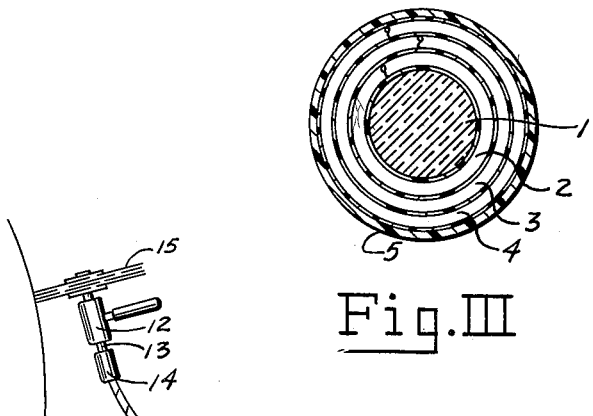
Fig.III
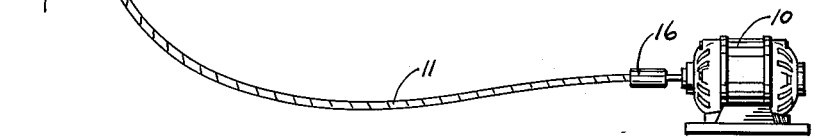
Fig.IV
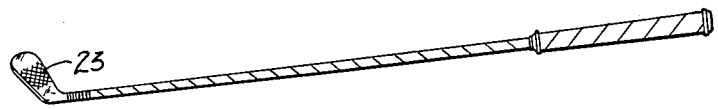
Fig.V
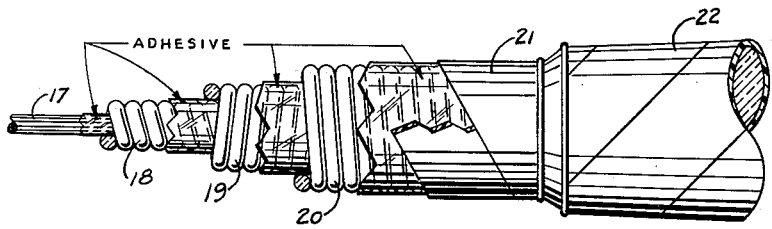
Fig.VI
JAMES L. RODGERS, JR.
ARTHUR M. HOWALD
INVENTORS
BY
Marshall and Marshall
ATTORNEYS.

Patented Oct. 30, 1951

2,573,361

UNITED STATES PATENT OFFICE 2,573,361

TORSION TRANSMITTING GLASS SHAFT
AND METHOD OF MANUFACTURE

James L. Rodgers, Jr., and Arthur M. Howald, Toledo, Ohio, assignors to Libbey-Owens-Ford Glass Company, Toledo, Ohio, a corporation of Ohio Application February 13, 1947, Serial No. 728,270

9 Claims. (Cl. 64—2)

This invention relates to torsion transmitting and torsion resisting shafts which can be employed for a variety of applications in which a shaft is used to transmit torsional power as, for example, a flexible power transmission shaft, or in which a shaft must withstand torsional force as, for example, the shaft of a golf club. The invention also includes a method of manufacturing such shafts from materials which inherently possess the required resiliency and flexibility and high tensile strength and, therefore, are adapted for use in such shafts.

We have found that a shaft embodying the invention constructed from bonded fiber can be made to withstand high torsional stress and to transmit high torque. We have found that the best material for use in constructing a shaft of this kind is either single strands of glass fibers or so-called "uni-directional" glass fabric. "Uni-directional" glass fabric consists of parallel strands laid adjacent each other and bonded together along their contacting edges either by the glass itself or by an adhesive on the surface of the strands. This method of construction results in a fabric having high tensile strength in one direction only, i. e. parallel with the strands.

In the drawings:

Figure I is an enlarged fragmentary view of a torsion transmitting shaft constructed in accordance with the invention and employing single strands of glass fibers.

Figure II is a view similar to Figure I but showing a shaft constructed in accordance with the invention which employs uni-directional glass fabric.

Figure III is an enlarged vertical sectional view taken substantially on the line III—III of Figure I.

Figure IV is a view in elevation of a buffing head employing a flexible shaft constructed in accordance with the present invention.

Figure V is a view in elevation of a golf club having a shaft constructed in accordance with the instant invention.

Figure VI is an enlarged fragmentary view of a portion of the shaft of the golf club illustrated in Figure V.

The shaft illustrated in Figure I consists of a central core 1 which extends longitudinally the entire length of the shaft. This central core is illustrated as being a single strand composed of continuous parallel glass fibers. Glass, having a high tensile strength, is excellent for giving the shaft longitudinal stability so that it does not stretch when used. Glass, however, is merely the preferred material for this purpose, and other materials advantageously may be employed in constructing shafts in accordance with the instant invention and in practicing the processes of the instant invention. For example, it may in some cases be desirable to use a central core made of artificial resin or of natural materials such as balsa wood, bamboo or other material.

The surfaces of the fibers in the central core are coated with a hard adhesive or bonding material such as, for example, a polymerized unsaturated polyester resin, if the core and other portions of the rod are constructed from glass; or a cellulosic adhesive, such as cellulose acetate or cellulose nitrate, if the rod is constructed from a core and fibers having a high cellulose content. Other adhesives such as urea-formaldehyde, melamine-formaldehyde and phenol-formaldehyde resins may advantageously be employed if the core and subsequently described layers are made of materials which bond readily with these adhesives.

Around the central core 1 there is tightly wrapped a helix 2 of a single strand. Again the preferable material is glass fiber yarn which is flexible and therefore relatively simple to form around the core and, of course, has a high tensile strength which contributes greatly to the successful operation of the shaft. The glass yarn may be coated with the adhesive prior to being wrapped around the central core or the adhesive may be spread on the helix after it is formed.

A second helical layer 3 is then wrapped around the first helical layer 2, it being noted that the direction of the helix is opposite to that in the layer 2. The alternating direction of the helixes is advantageous since it affords a wrapping part of which is placed in tension regardless of the direction of the torsional force transmitted. Glass fibers or other fibers forming the strands have relatively little strength under compression and, consequently, the strength of the shaft is derived from that helical wrapping which is under tension when the shaft is used.

It may be desirable to wrap a third helical layer 4 around the second layer and, if additional strength or size is desirable, additional helical layers of strands of glass or other fibrous material may be wrapped around the shaft, increasing with each layer the amount of force which the shaft can transmit. Successive helixes of glass or other fibers preferably are wrapped in opposite directions.

A sufficient quantity of adhesive should be spread on each strand before it is wrapped into a helix or on the exterior of each successive helical layer to constitute a permanent bond between the layers when the adhesive has set.

In order to provide a smooth exterior for the shafting it may be wrapped with a spiral ribbon of a smooth tough material 5. This wrapping should be made of a material which bonds well with the resin used to bond the strands in place. This material may, for example, be cellophane, cellulose acetate or other smooth tough material to furnish a hard smooth exterior for the shaft.

After the shaft has been constructed in accordance with the method described it may be passed through an oven which is heated to a temperature sufficient to cause the hardening of the adhesive or bonding material employed. After the hardening process the shaft becomes a unitary structure comprising an almost solid rod of the adhesive through which the helixes of fibers extend continuously, affording great tensile strength to resist torsional stresses.

The process of the invention above disclosed may be practiced by manual manipulation or through the use of various types of machinery, spindles and wrapping gears which are known in the art.

The particular form of apparatus which is employed to construct the shaft by the process of the invention is not important since numerous machines are well known in the art for manufacturing structures containing helixes.

Figure II illustrates a shaft which is constructed by a process identical with the process employed for constructing the shaft illustrated in Figure I, but which is made from alternately wrapped helical layers of uni-directional fabric. In Figure II this fabric is shown as having six parallel individual strands bonded together along their contacting edges, but this is merely illustrative and shafts can be constructed using uni-directional fabric having either a greater or a lesser number of strands as desired. The core 6 and each successive helical layer 7, 8 or 9 are coated with the bonding material, in a manner similar to the manner in which the strands described in connection with Figure I are coated, and the entire structure is unified by the hardening of the adhesive used to bond the layers together.

Figure III is a vertical cross section of the shaft of Figure I, showing how the helixes are tightly wrapped about the core and about each other. As can be seen in Figure III there usually is a thin layer of bonding material between each layer of strands. This bonding material fills the somewhat triangular grooves between adjacent strands and bonds all the layers into a unitary structure.

Figure IV shows a buffing head having a driving motor 10, a flexible shaft 11 (which is constructed in accordance with the invention) and a buffing unit 12 which journals a rotatable shaft 13 on one end of which is mounted a shaft coupler 14 and on the other end of which is mounted a buffer 15. The power end of the shaft 11 is coupled to the shaft of the motor 10 by a coupler 16.

Figure V illustrates a golf club having a shaft constructed in accordance with this invention. When a golf club is used and the ball is struck by the player, because the head of the club extends to one side of the center line of the shaft, a moment is created which exerts a torsional force on the shaft. As can be seen by reference to Figure V the shaft has a central core 17 around which is wrapped an innermost helix 18, an oppositely directed helix 19 and a third helix 20. In constructing a golf club shaft, inasmuch as the torsional force to be resisted will always be exerted in the same direction, the outermost helical layer of filaments should be wrapped in a direction such that its strands will be placed under tension when the ball is struck. It will be noted that in the shaft illustrated in Figures V and VI the innermost and the outermost helixes both are wrapped in a direction to provide this necessary resistance to the torsional force created by the blow. The shaft of the golf club may be wrapped with a layer 21 of the finishing material. The core 17, helical layers 18, 19 and 20 and the outer wrapping 21 are all bonded together by the adhesive with which they are all coated. A handle 22, which may be formed of any desirable material, is secured on the upper end of the shaft to afford a grip for the player. The lowermost end of the shaft is inserted in the butt of the golf club head 23 in the usual manner.

Golf club shafts constructed in accordance with the invention have great resilience and whip, are extremely light for their strength and resist excellently the high torsional forces created by the impact of the golf club head against the golf ball. Shafts of this kind may be tapered if desired by the employment of a tapered core or by the use of strands which gradually change in size throughout their length.

The embodiments of the invention which have been described may be modified to meet various requirements.

Having described the invention, we claim:

1. A torsion transmitting shaft comprising, in combination, a central longitudinally extending glass fiber core, a plurality of left and right hand wrapped helixes of single strands of parallel continuously extending fiber successively and alternately wrapped around each other and around said central core, and a hard adhesive interposed between the fiber strands for bonding the strands together.

2. A torsion transmitting shaft comprising, in combination, a central longitudinally extending core, a plurality of left and right hand wrapped helixes of uni-directional glass fabric successively and alternately wrapped around each other and around said central core, and a hard adhesive interposed between said fabric helixes to bond said helixes together.

3. A torsion transmitting shaft comprising, in combination, a central longitudinally extending glass fiber core, a plurality of left and right hand wrapped helixes of uni-directional glass fabric successively and alternately wrapped around each other and around said central core, and a hard adhesive interposed between the fabric helixes to bond said helixes together.

4. A torsion transmitting shaft comprising, in combination, a central longitudinally extending core, a plurality of left and right hand wrapped helixes of strands of parallelly extending glass fibers successively and alternately wrapped around each other and around said central core and a hard adhesive bonding said strands together, the outermost one of said helixes being directed so as to put the fibers therein in tension when torsion is transmitted during usage of said shaft.

5. A shaft for a golf club having superior toughness, flexibility and whip comprising a longitudinally extending glass fiber core and a plurality of layers of strands of glass fiber each layer being helically wrapped and directed oppositely to the preceding layer, each layer being bonded to alternate layers by a hard adhesive, the outermost layer being wrapped in a direction to place the fibers thereof in tension when a ball is struck with said club.

6. A torsion transmitting shaft comprising, in combination, a central longitudinally extending core, a plurality of layers of glass fibers, each layer being helically wrapped and directed oppositely to the preceding layer and an outer wrapping of a smooth, tough, flexible synthetic film.

7. A method of forming a torsion transmitting shaft of light weight and superior toughness and flexibility which consists in wrapping successive adhesive coated helical layers of single strands of glass fibers around an adhesive coated longitudinally extending core, successive helical layers being oppositely directed, and then hardening the adhesive to form a unitary structure.

8. A method of constructing a torsion transmitting and resisting shaft which comprises wrapping a tight helix of hardenable adhesive coated uni-directional glass fibers around an adhesive coated longitudinally extending glass core, wrapping successive similar helixes in additional layers, successive helixes being oppositely directed, and hardening the adhesive to form a unitary structure.

9. A method of constructing a torsion transmitting and resisting shaft which comprises wrapping a tight helix of hardenable adhesive coated uni-directional glass fibers around an adhesive coated longitudinally extending glass core, wrapping successive similar helixes in additional layers, successive helixes being oppositely directed, wrapping the structure thus formed with a hard, tough, smooth, ribbon-like material and hardening the adhesive to form a unitary structure.

JAMES L. RODGERS, Jr.
ARTHUR M. HOWALD.

REFERENCES CITED

The following references are of record in the file of this patent:

UNITED STATES PATENTS

| Number | Name | Date |
|---|---|---|
| 1,990,514 | Angell | Feb. 12, 1935 |
| 2,133,183 | Baird et al. | Oct. 11, 1938 |
| 2,142,497 | Clendenin | Jan. 3, 1939 |
| 2,184,899 | Shand | Dec. 26, 1939 |
| 2,224,274 | Powers | Dec. 10, 1940 |
| 2,293,918 | Planiol | Aug. 25, 1942 |
| 2,335,644 | Camp | Nov. 30, 1943 |